UNITED STATES PATENT OFFICE 2,511,942

VINYLETHYLENE CARBONATE AND ITS PREPARATION

William W. Prichard, Wilmington, Del., assignor to E. I. du Pont de Nemours & Company, Wilmington, Del., a corporation of Delaware No Drawing. Application May 3, 1948, Serial No. 24,922

4 Claims. (Cl. 260—338)

This invention relates to organic chemistry and more particularly to a new organic carbonate and to its preparation.

This invention has as an object the preparation of a new organic carbonate. A further object is the preparation of a new polymerizable compound. Other objects will appear hereinafter.

These objects are accomplished by vinylethylene carbonate of the probable formula

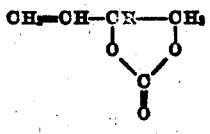

and its preparation by reacting carbon dioxide with butadiene monoxide, i. e.,

at elevated temperatures, preferably in the range 175–225° C., in the presence of a solid base, preferably potassium hydroxide on activated charcoal.

Vinylethylene carbonate, or 3-butene-1,2-diol carbonate as it may also be called, is a colorless liquid boiling at approximately 101° C./5 mm. or at 123° C./14 mm. It has a refractive index of $n_D^{25}$ 1.447 and a density of $d_4^{25}$ 1.183. On heating with benzoyl peroxide it polymerizes to a resin.

The following examples in which parts are by weight are illustrative of the invention.

Example I

A pressure vessel was filled to about ¼ its capacity with 105 parts of butadiene monoxide. To the vessel was then added 150 parts of carbon dioxide and 10 parts of 10% potassium hydroxide deposited on activated charcoal (i. e., 10 parts KOH per 90 parts carbon). The vessel was sealed and heated at 200° C. under autogenous pressure for eight hours. The vessel was then opened, the product was separated from the catalyst by filtration, and distilled. This gave 72 parts of a colorless liquid boiling at about 123° C. at 14 mm. Other properties obtained were: $n_D^{25}$ 1.4472 and $d_4^{25}$ 1.1827. The following data indicate that this product is vinylethylene carbonate:

Carbon and hydrogen analyses of the product gave the following results: Calculated for $C_5H_6O_3$: C, 52.64%; H, 5.30%. Found: C, 53.18%, 53.18%; H, 5.65%, 5.56%.

On hydrolysis with aqueous sodium hydroxide the product yielded sodium carbonate. Titration of the hydrolysis products gave the following results: Calculated for $C_5H_6O_3$: $CO_2$, 38.58%. Found: $CO_2$, 37.70%.

On heating the product with 5% of benzoyl peroxide for nineteen hours at 78° C. a pale yellow resin was obtained. A further sample of the product, i. e., of the liquid boiling at 123° C./14 mm., was heated at 130° C. with 0.5% di-tertiary-butyl peroxide under 7500 atmospheres pressure. This gave a clear, brittle solid which softened at about 105° C. This solid was insoluble in water and in most organic solvents tested but was soluble in ethylene carbonate. The following analysis indicates that this solid is a polymer of vinylethylene carbonate: Analysis: Calculated for polyvinylethylene carbonate: $[(C_5H_6O_3)_x]$: C, 52.64%; H, 5.30%. Found: C, 52.92%, 52.97%; H, 5.71%, 5.57%.

Example II

Fifty parts of butadiene monoxide, 10 parts of 5% sodium hydroxide-on-carbon, and 250 parts of carbon dioxide were charged into a shaker tube and heated under autogenous pressure at 225° C. for eight hours. The reaction mixture was separated from the catalyst and distilled, first at atmospheric pressure to remove unchanged butadiene monoxide (42.5 parts, boiling 65–67° C.), and then at reduced pressure to separate the vinylethylene carbonate. The carbonate (0.5 part) was identified by treatment with cold sodium hydroxide in methanol which resulted in the precipitation of sodium carbonate.

From the foregoing examples it is apparent that, although vinylethylene carbonate ($C_5H_6O_3$) is decomposed on treatment with alkali in aqueous or alcoholic solutions even in the cold, it can nevertheless be obtained in good yield at elevated temperatures from butadiene monoxide and carbon dioxide in the presence of solid potassium hydroxide. Under the conditions used in preparing vinylethylene carbonate the potassium hydroxide reacts with carbon dioxide to form potassium bicarbonate. Hence it is to be understood that reference to potassium hydroxide in the claims includes its reaction product with carbon dioxide. Sodium hydroxide can also be used as catalyst but is much less effective. Other alkalies, e. g., lithium hydroxide, sodium carbonate, sodium bicarbonate and potassium carbonate, also have some catalytic effect. The catalysts can be used alone but are preferably used on an inert support, such as carbon, pumice, alumina or silica gel. In examples I and II the reaction is carried out under autogenous pressure which, under the conditions used, was roughly of the order of 300 atmospheres. Higher or lower pressures can be employed but it is desirable to operate above 30 atmospheres and preferably within the range of 100 to 3000 atmospheres.

As illustrated in Example I, vinylethylene carbonate can be polymerized to resinous products when heated in the presence of a vinyl-type polymerization catalyst, such as an organic peroxide. In general, free-radical producing substances can be used as catalysts in the polymerization. Polymerization of vinylethylene carbonate in the presence of other polymerizable unsaturated compounds leads to the formation of copolymers. As examples of polymerizable materials with which vinylethylene carbonate can be copolymerized may be mentioned olefins, e. g., ethylene, isobutylene and styrene; dienes, e. g., butadiene and chloroprene; vinyl esters, e. g., vinyl chloride and vinyl acetate; acrylic compounds, e. g., ethyl acrylate, acrylonitrile, and methyl methacrylate; fluoroethylenes, e. g., vinyl fluoride and tetrafluoroethylene; maleic and fumaric compounds, e. g., maleic anhydride and diethyl fumarate; and vinyl ethers, e. g., vinyl ethyl ether and vinyl butyl ether. The polymers, including the copolymers, can be used in making molding, coating and adhesive compositions.

Other uses for vinylethylene carbonate are as solvents and as intermediates in the preparation of other compounds.

The foregoing detailed description has been given for clearness of understanding only and no unnecessary limitations are to be understood therefrom. The invention is not limited to the exact details shown and described for obvious modifications will occur to those skilled in the art.

What is claimed is:
1. Vinylethylene carbonate.
2. A process for the preparation of vinylethylene carbonate wherein carbon dioxide and butadiene monoxide,

are reacted at 175–225° C. and under 100 to 3000 atmospheres pressure in the presence of solid potassium hydroxide.

3. A process for the preparation of vinylethylene carbonate wherein carbondioxide and butadiene monoxide,

are reacted at 175–225° C. and under 100 to 3000 atmospheres pressure in the presence of a solid alkali metal hydroxide.

4. A process for the preparation of vinylethylene carbonate wherein carbon dioxide and butadiene monoxide,

are reacted at 175–225° C. and a pressure of at least 30 atmospheres in the presence of a solid alkali.

WILLIAM W. PRICHARD.

REFERENCES CITED

The following references are of record in the file of this patent:

UNITED STATES PATENTS

| Number | Name | Date |
| --- | --- | --- |
| 1,907,891 | Steimmig et al. | May 9, 1933 |

FOREIGN PATENTS

| Number | Country | Date |
| --- | --- | --- |
| 418,230 | Great Britain | Oct. 22, 1934 |

OTHER REFERENCES

Bissinger et al., J. Am. Chem. Soc., vol. 69, Dec. 1947, pages 2955–2961.